US009389972B2

(12) United States Patent
Chadha et al.

(10) Patent No.: US 9,389,972 B2
(45) Date of Patent: Jul. 12, 2016

(54) DATA RETRIEVAL FROM STACKED COMPUTER MEMORY

(71) Applicant: International Business Machines Corporation, Armonk, NY (US)

(72) Inventors: Saurabh Chadha, Bangalore (IN); Hillery C. Hunter, Chappaqua, NY (US); Kyu-hyoun Kim, Mount Kisco, NY (US); Abhijit Saurabh, Patna (IN); Saravanan Sethuraman, Bangalore (IN); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 14/276,046

(22) Filed: May 13, 2014

(65) Prior Publication Data

US 2015/0331764 A1    Nov. 19, 2015

(51) Int. Cl.
*G06F 11/00*    (2006.01)
*G06F 11/20*    (2006.01)
*G06F 11/14*    (2006.01)

(52) U.S. Cl.
CPC ............ *G06F 11/2094* (2013.01); *G06F 11/14* (2013.01); *G06F 11/1435* (2013.01); *G06F 11/1469* (2013.01); *G06F 11/20* (2013.01); *G06F 11/2028* (2013.01); *G06F 11/2069* (2013.01); *G06F 2201/84* (2013.01)

(58) Field of Classification Search
CPC ............ G06F 11/2094; G06F 11/1469; G06F 2201/84; G06F 11/14; G06F 11/1435; G06F 11/20; G06F 11/2028; G06F 11/2069
See application file for complete search history.

(56) References Cited

U.S. PATENT DOCUMENTS

| 5,973,392 | A | 10/1999 | Senba et al. | |
|---|---|---|---|---|
| 7,590,024 | B2 | 9/2009 | Kang | |
| 7,617,354 | B2 * | 11/2009 | Oh | G11C 7/1018 711/105 |
| 7,809,873 | B2 | 10/2010 | Perry et al. | |
| 8,031,505 | B2 * | 10/2011 | Kang | G11C 5/02 365/51 |
| 8,059,443 | B2 | 11/2011 | McLaren et al. | |
| 8,471,362 | B2 | 6/2013 | Lee | |
| 2004/0257886 | A1 * | 12/2004 | Adams | G11C 29/70 365/200 |
| 2006/0212768 | A1 * | 9/2006 | Ishida | G01R 31/3183 714/733 |
| 2011/0292708 | A1 * | 12/2011 | Kang | H01L 23/481 365/63 |
| 2012/0005420 | A1 * | 1/2012 | Johnson | G11C 7/1027 711/105 |

(Continued)

FOREIGN PATENT DOCUMENTS

WO    2012034034 A1    3/2012

OTHER PUBLICATIONS

Chadha et al., "Data Retrieval From Stacked Computer Memory," U.S. Appl. No. 14/462,602, filed Aug. 19, 2014.

(Continued)

*Primary Examiner* — Bryce Bonzo
*Assistant Examiner* — Anthony J Amoroso
(74) *Attorney, Agent, or Firm* — Stosch Sabo; Robert Williams

(57) ABSTRACT

Data is retrieved from a stacked memory device having a plurality of slave memory chips in response to recognizing a problem in the stacked memory device. The problem is determined to be associated with a primary driver module in the stacked memory device. In response, the primary driver module is disabled and an emergency driver module is enabled. Each of the plurality of slave memory chips are selected using a multiplexing unit to retrieve data using the emergency driver module.

11 Claims, 4 Drawing Sheets

(56) References Cited

U.S. PATENT DOCUMENTS

| | | |
|---|---|---|
| 2012/0195137 A1 | 8/2012 | Yun et al. |
| 2012/0299194 A1 | 11/2012 | Lee et al. |
| 2013/0031418 A1 | 1/2013 | Bellofatto et al. |
| 2013/0051165 A1 | 2/2013 | Byeon |
| 2013/0148402 A1 | 6/2013 | Chang et al. |
| 2013/0176763 A1 | 7/2013 | Ware et al. |
| 2013/0339820 A1* | 12/2013 | Cordero .............. G06F 11/1048 714/773 |
| 2013/0339821 A1* | 12/2013 | Cordero .............. G06F 11/1666 714/773 |

OTHER PUBLICATIONS

List of IBM Patents or Patent Applications Treated As Related.

Bringivijayaraghavan et al., "Stacked Memory Device Control," Filed May 13, 2014.

IBM, "Logic Partitioning in VLSI Chips to Improve Failure Analysis", IP.com Prior Art Database Technical Disclosure, IP.com No. IPCOM000059803D, (Original Publication: Jan. 1, 1986, TDB 01-86 p. 3702-3703), Electronic Publication: Mar. 8, 2005. http://ip.com/IPCOM/000059803.

IBM, "Means of Increasing Yield on Logic Chips", IP.com Prior Art Database Technical Disclosure, IP.com No. IPCOM000103077D, (Original Publication: Jun. 1, 1990, Research Disclosure n314 06-90), Electronic Publication: Mar. 17, 2005. http://ip.com/IPCOM/000103077.

Kinsley, T., "DDR4 Module Level Trends and Features," Micron Technology, JEDEC, Global Standards for the Microelectronics Industry, Server Memory Forum 2011.

* cited by examiner

DATA RETRIEVAL FROM STACKED COMPUTER MEMORY

BACKGROUND

The present disclosure relates to computer memory and data retrieval. More specifically, the present disclosure relates to methods of retrieving data from stacked computer memory modules.

Stacked or 3-D computer memory modules provide benefits to computer systems, including reduced signal transmission times between chips on a printed circuit board or between stacked memory modules, and may improve memory and computer system performance. Through-silicon vias (TSVs) may be used to interconnect stacked computer memory modules in order to transmit power and data through the assembly of computer chips. In many circumstances, a computer memory chip may be printed having open spaces, frequently at the perimeter of the chip, to accommodate a through-silicon via connected to another memory chip, to a master computer memory chip, or to a power line (via a master computer memory chip). Computer memory arrays or logical elements on the computer memory chip may be electrically connected to one or more TSVs in order to allow a master computer memory chip to read data from a computer memory array, write data to a computer memory array, or to refresh data stored in a computer memory array.

A stacked computer memory module may include a single master memory chip (master chip) having logical circuitry that controls aspects of chip function such as data refresh and reading and writing data to and from several slave memory chips (or slave chips) that may contain further logical circuitry, power transmission, and DRAM memory arrays to hold data for a computer processor or other elements of a computer system. Communication within the computer system, coordinated through a memory controller in the computer memory system, may run through the memory system data bus into a master chip I/O driver array and further into a through silicon via (TSV) to access a selected memory array in order to read or to write data. Data may be transmitted to or from slave memory chips via electrical connections (pads) at the top of the master chip that are electrically connected to TSVs in slave chips via a permanently fastened solder bump between the pad and a TSV.

SUMMARY

According to embodiments, a computing system includes a stacked memory device having a plurality of slave memory chips, and a master chip. The master chip contains a primary driver module configured to communicate data with the plurality of slave memory chips; an emergency driver module configured to communicate data with the plurality of slave memory chips; and a multiplexing unit connected to the plurality of slave memory chips and to the emergency driver module. A processor is configured to recognize a problem in the stacked memory device and determine that the problem is associated with the primary driver module. A memory controller is configured to, in response to determining that the problem is associated with the primary driver module; generate control signals identifying a slave memory chip of the plurality of slave memory chips for data recovery; disable the primary driver; enable the emergency driver module; configure the multiplexing unit to access an identified slave memory chip for data recovery; and retrieve data from the identified slave memory chip using the emergency driver module.

Various embodiments are directed toward a method of retrieving data from a stacked memory device having a plurality of slave memory chips. The method includes recognizing a problem in the stacked memory device; determining that the problem is associated with a primary driver module in the stacked memory device and in response: disabling the primary driver module; enabling an module; and selecting each of the plurality of slave memory chips using a multiplexing unit to retrieve data using the emergency driver circuit.

A stacked memory device includes a plurality of slave memory chips, and a master chip. The master chip contains a primary driver module configured to communicate data with the plurality of slave memory chips and an emergency driver module configured to communicate data with the plurality of slave memory chips. A multiplexing unit of the master chip is connected to the plurality of slave memory chips and to the emergency driver module. Master control logic is configured to, in response to a control signal identifying a slave memory chip for data recovery: disable the primary driver module; enable the emergency driver module; configure the multiplexing unit to access an identified slave memory chip for data recovery; and retrieve data from the identified slave memory chip using the emergency driver module.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
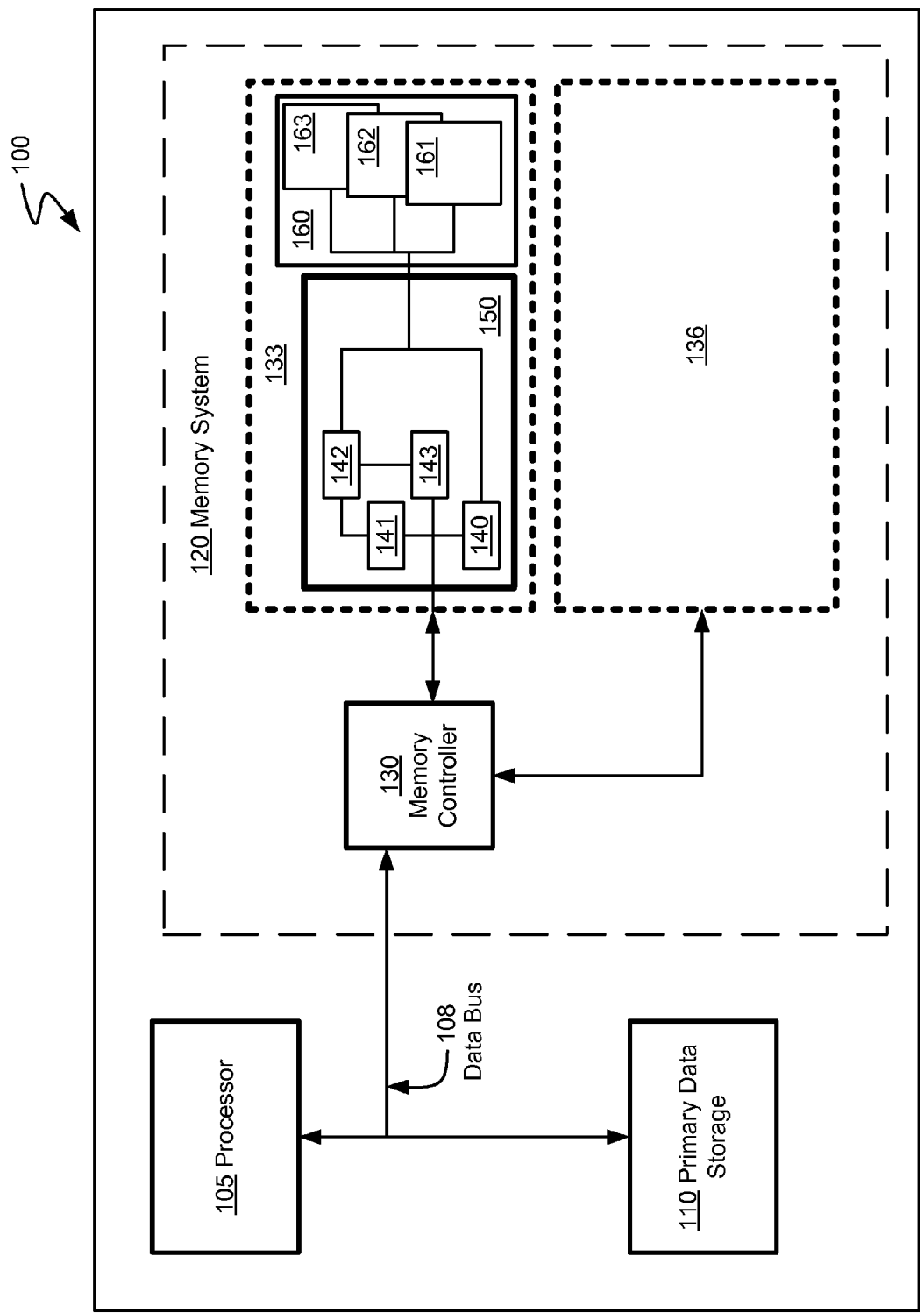
FIG. 1 depicts elements of a computer system having stacked memory modules configured to provide emergency access to stored data according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer memory chips, and more particular aspects relate to data retrieval from stacked computer memory modules or 3-D memory chips, especially 3-D DRAM chips. While the present disclosure is not necessarily limited to such applications, various aspects of the disclosure may be appreciated through a discussion of various other types of digital data storage using the context of a stacked assembly of DRAM chips.

Embodiments of the present disclosure are based upon a recognition that slave memory chips may depend on the master chip in a stacked computer memory module for communication functions and contain little or no logical circuitry that may coordinate data transmission into or out of the slave chip. Should a failure in the master chip occur, portions of a slave chip or entire slave chips might be prevented from communicating with the remainder of the computer system. Data stored in a stacked computer memory module may become corrupted due to an inability to refresh the cells of the computer memory array in the slave chip, or may merely become inaccessible because a read/write I/O driver in the master chip experiences a failure. Some embodiments of the present invention may provide additional circuitry in a stacked computer memory module that may recover lost or otherwise inaccessible computer data.

FIG. 1 shows a computer system 100 consistent with embodiments of the present disclosure. Computer system 100 contains a processor circuit (or just "processor") 105 connected to a primary data storage 110 by a data bus 108. Data bus 108 may further connect a memory controller 130 in a memory system 120. Memory controller 130 may further be connected to a first stacked memory module 133 and a second stacked memory module 136. Each stacked memory module may contain a master chip 150 and a plurality of slave memory chips 160 stacked on top of the master chip. The number of slave chips may vary in different embodiments of the present disclosure. Many embodiments of memory modules have between two and sixteen memory chips, although the number of memory chips may vary according to design and performance parameters determined for a particular memory device. The master chip may be connected to a slave chip 161 that overlays it using a solder bump that electrically connects a pad on the master chip to a through silicon via that penetrates through the entirety of the slave memory chip 161 and is connected to a computer memory array in the slave chip. Further slave memory chips 162 & 163 may be stacked on top of the first slave memory chip 161 using a similar pattern of solder bump and TSV electrical connections. The number of solder bump/TSV interconnects at each level of the stacked computer memory module may decrease as the distance from the master chip increases. Some data transmission solder bump/TSV interconnect stacks may penetrate the entire stack, while others may penetrate through only a few slave chips. Other solder bump/TSV interconnect stacks may convey electrical power to layers of the stacked computer memory module and may penetrate a few or the entire stack of slave memory chips in the stacked computer memory module.

Within stacked computer memory module 133 there is a plurality of slave memory chips 160 from which data may be read and to which data may be written and stored. The data bus may electrically connect the memory controller 130 to elements within stacked computer memory modules 133 and 136 including a master chip 150 and slave memory chips 161, 162, and 163. Data transmitted between memory controller 130 and a memory array in a slave memory chip 161 may pass through a primary driver module 140 that is electrically connected to each slave memory chip 161, 162, and 163 in the stacked computer memory module 133. Memory controller 130 can facilitate the transfer of data between processor 105 or primary data storage 110, primary driver module 140, and one of the plurality of slave memory chips 160.

Consistent with embodiments of the present disclosure, primary driver module 140 can be configured to provide read and write accesses with relatively high bandwidth. This can be accomplished by using a plurality of read driver circuits and write driver circuits that are configured to communicate data on separate output lines, or pins, of the stacked memory module.

In addition to a group of read drivers and write drivers used for normal operation, many primary drivers contain at least one additional pair of read and write drivers that may be enabled when a failure occurs elsewhere in the primary driver module.

Stacked computer memory module 133 may further contain memory logic 143 that can be used to select which data is provided to the emergency driver module 141 using a multiplexing unit 142. For example, the multiplexing unit 142 may be configured to allow each slave memory chip 161, 162, and 163 in the stacked computer memory module 133 to be individually selected. Memory logic 143 may be electrically connected to the primary driver module 140 and the emergency driver module 141 and the data bus 108, allowing it to send and receive control signals to and from memory controller 130 and the drivers in the stacked computer memory module 133.

Consistent with various embodiments, an emergency driver module 141 may be configured to read and write data at a lower rate than the primary driver module. For example, the primary driver module 140 may be configured with eight data channels for parallel access to eight slave memory chips in the stacked computer memory module 133. An emergency driver module 141 in the same master chip 150 may be configured to access the plurality of slave memory chips 160 sequentially, or at ⅛ the rate of the primary driver module.

During normal operation, stacked computer memory module 133 may operate by passing data through the primary driver module 140 in order to read data from or write data to one of the plurality of slave memory chips 160. However, if a hardware failure occurs within the primary driver module that impacts the primary driver module's ability to read data from or write data to slave memory chips, the system can be configured to disable the primary driver module and enable in its place the emergency driver module in order to extract data from the slave memory chips in the stacked computer memory module.

According to various embodiments, a memory controller 130 can be configured to identify data errors that can be caused by problems with the primary driver module 140. The memory controller 130 can then transmit a control signal to master chip memory logic, which can respond by disabling the primary driver module 140 and enabling the emergency driver module 141. If stacked computer memory module 133 is configured by a control signal to use the emergency driver module 141, the process of reading data from slave memory chips within the stacked memory module may require extra time compared to the time necessary to read data through the primary driver module 140. In order to accommodate the lower data access rates of an emergency driver module 141, a master chip 150 may include a multiplexing unit 142 that can sequentially access individual slave memory chips in the plurality 160 to be read by the emergency driver module 141.

When an emergency driver module 141 is used to retrieve data from a plurality of slave memory chips 160, the data may be sequentially accessed in individual slave memory chips and routed across the data bus 108 to be stored in a primary data storage 110 or some other storage medium in the computer system until the data can be restored to a functional stacked memory device in computer memory system 120.

Figure 2:
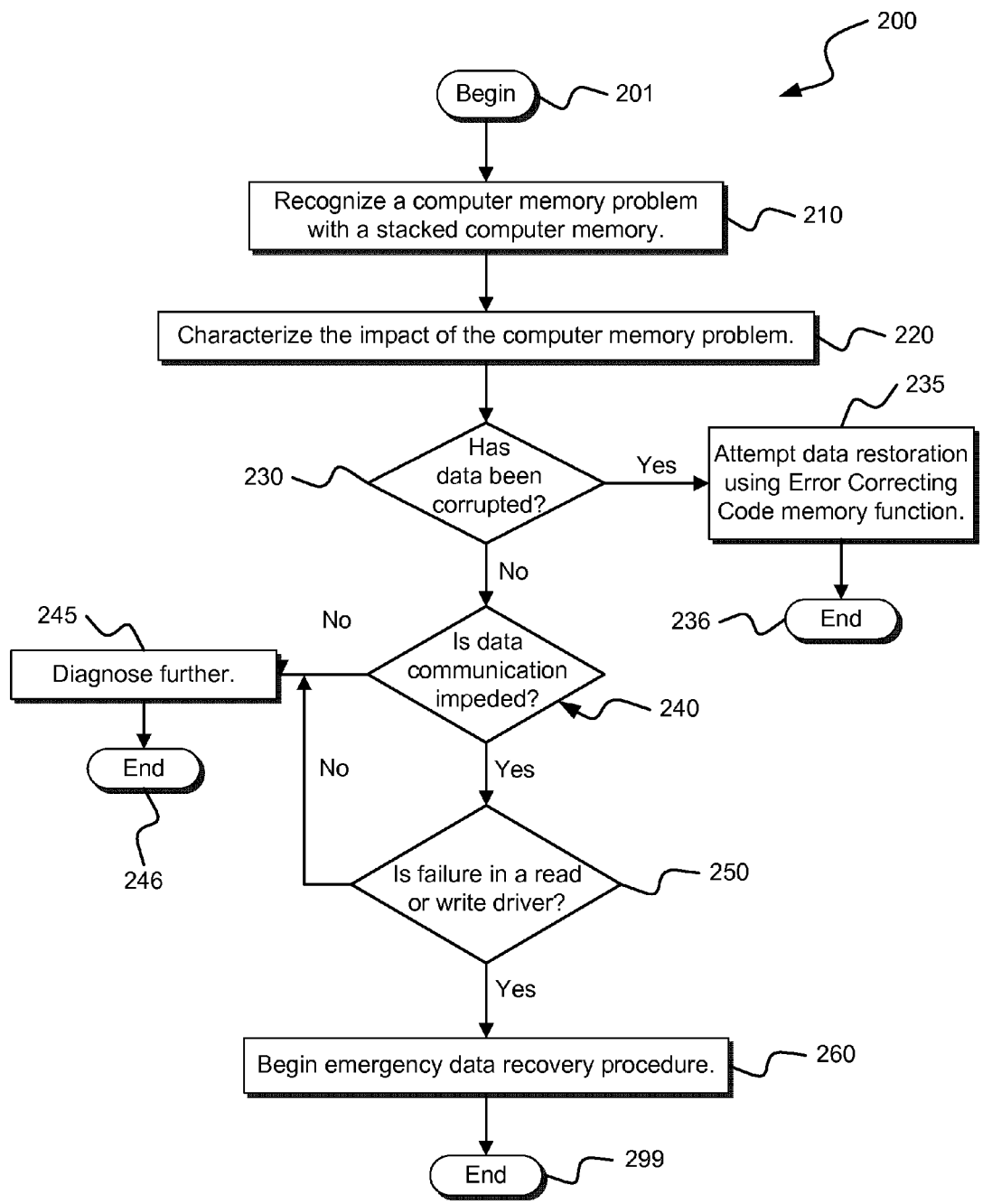
FIG. 2 describes a method of determining whether to enable an emergency data retrieval circuit in a stacked memory module according to embodiments of the present disclosure.

FIG. 2 outlines a method 200 of recognizing when an emergency data recovery procedure should be implemented to recover data from a stacked computer memory device. The method begins in block 201. The first step in the method is to recognize that a computer memory problem has occurred in a stacked computer memory, as shown in block 210. For instance, a memory controller may detect a bit error using error correcting code (ECC) or similar techniques.

Computer memory problems may be characterized, as shown in block 220, by the response performed by the computer system when they occur. For example, in response to some computer memory problems a computer memory system may perform an emergency data retrieval to extract data stored in a stacked computer memory and to transfer it to a secondary memory, whether another stacked computer memory or some other type of storage. In response to other errors, the computer memory system may restore corrupted data using error correcting code functionality or to enable a redundant driver in a driver module.

Consistent with various embodiments, the computer system may be configured to characterize memory errors or problems according to whether or not the data recovery procedure should be undertaken. For example, some computer memory errors may be characterized as data content errors, and may include unexpected flipped bits, such as when a "zero" when a "one" is expected in a particular memory cell. Cosmic rays, voltage spikes, or degraded capacitor cell lining may contribute to such data content errors. In response to such an error, computer memory systems equipped with error correcting code (ECC) capable memory may undertake to correct the corrupted data using additional "check" bits stored in the computer memory alongside the data being corrected. It is common for ECC memory systems to recover data from such types of single-occurrence, recoverable errors. In some computer systems, memory scrubs may be periodically performed to eliminate such recoverable errors and to avoid the occurrence of multiple flipped bits within a block of memory covered by ECC protection. When data corruption is detected, as the method asks in step 230, the computer memory system may undertake to restore the data using error correcting code functionality, as described in step 235, before that branch of the method ends in block 236.

Some errors may result in repeatable data errors, such as capacitor breakdown of a single memory cell, a word or bit line breakdown, or a driver failure. These types of errors may result in repeatable or permanent data loss. As part of the method, shown in block 240, one may characterize whether a computer memory errors is associated with the transfer of data into or out of memory arrays in the slave memory chips. For example, a break in the electrical path between a memory array (or a cell in the array) and the primary driver module or memory controller may prevent full access to data stored in a slave memory chip. Another hardware error may be the failure of a driver in a primary driver module associated with transferring data into or out of portions of a memory array, as the method describes in block 250. Should a driver failure occur, it may be appropriate to begin an emergency data retrieval procedure as described in block 260 before ending that branch of the method in block 299. Should driver failure not be the cause of impeded communication with memory arrays, then the computer system may pursue further diagnosis of the problem, as described in block 245, before ending that branch of the method in block 246.

In particular embodiments, firmware installed in a memory controller of a computer memory system may be configured to perform a series of tests to measure read and write performance of a stacked computer memory module, verifying proper function of each of the slave memory chips in the stacked device (i.e., eliminating memory cell breakdown as a possible source of the memory error) and further verifying that the communication paths to each of the slave memory chips functions according to its intended design. Some errors may arise when thermal or mechanical stress or vibrations cause a break between a solder bump and a TSV in a stacked memory device, breaking a communication path to a slave memory chip. The results of the testing and verification can then be used to categorize the error relative to the corrective actions (if any) to be undertaken, which can include the use of the emergency driver module.

For instance, some embodiments of stacked computer memory devices may have redundant communication paths that can be activated when occurs read or write driver in a primary driver module fails, routing around the broken communication path. Some computer memory devices may have primary driver modules with backup read or write drivers built into the primary driver module, allowing the master chip to route around a communication breakdown to maintain full function. When the redundant driver is still available, it can be enabled allowing the stacked memory module to still function properly. However, under some circumstances, as when there are insufficient surplus read or write drivers in a driver module following damage to the master chip, an emergency driver module containing an emergency driver module may be activated to route around the primary module in order to access the memory arrays in the slave memory chips of the stacked computer memory device.

Figure 3:
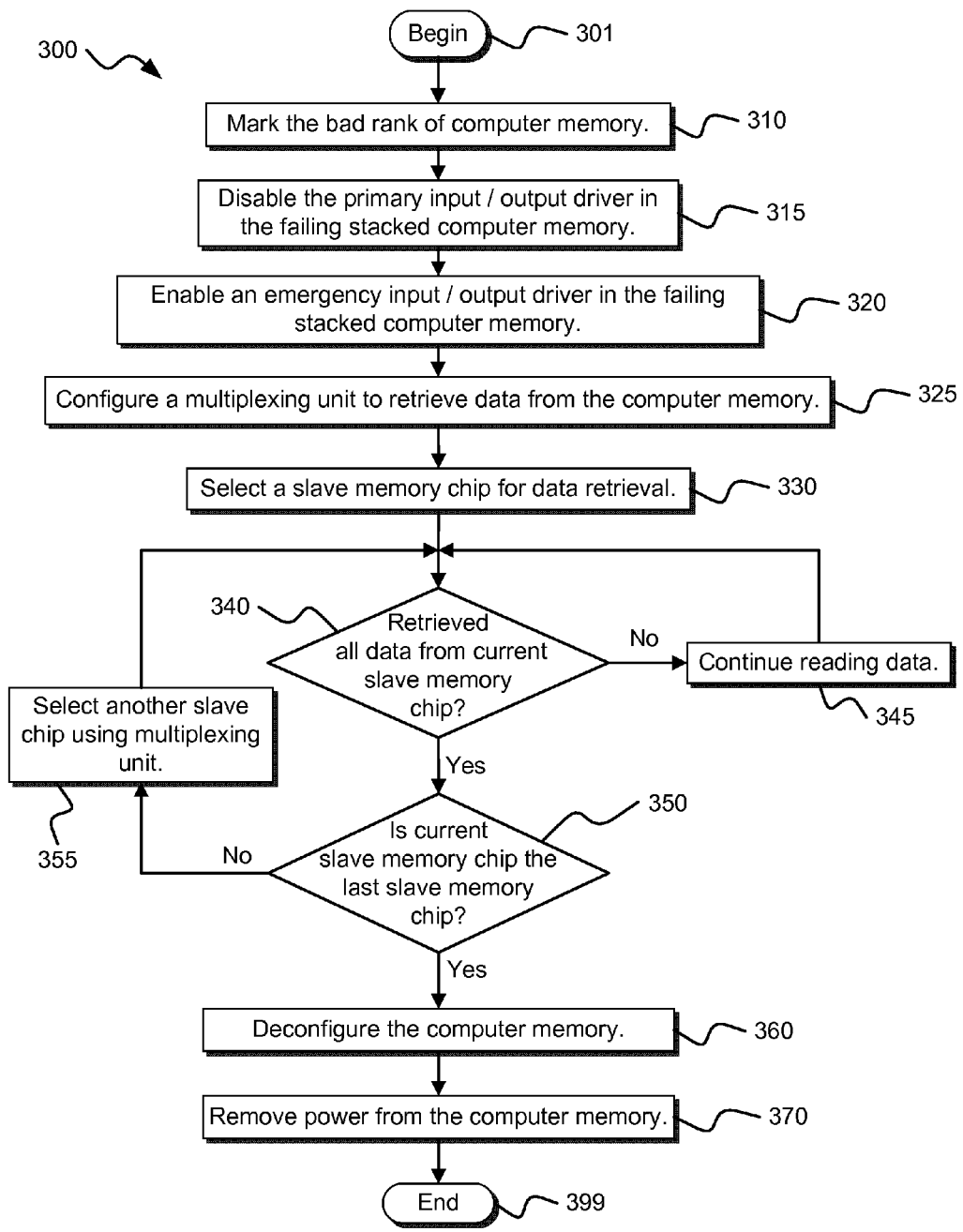
FIG. 3 describes a method of using an emergency data retrieval circuit in a stacked memory module according to embodiments of the present disclosure.

FIG. 3 outlines a method 300 of performing a computer memory recovery procedure using an emergency memory driver in a master chip according to aspects of the present disclosure. The method begins in block 301. Following the identification of a read/write driver failure as previously described in FIG. 2, the memory controller in the computer system may apply a mark to the rank of computer memory where the driver failure has occurred, as shown in block 310, as may be done with computer memory systems that contain ECC related functions.

According to embodiments, the memory controller can be configured to generate control signals for instructing retrieval of data from the stacked memory device. One such control signal can be sent to the master memory logic to disable the primary driver module in the master chip, as shown in block 315. The memory controller may then send a second control signal to the master memory logic to enable the emergency driver module built into the master chip, as described in block 320. At this point in the method, the defective primary driver module may have been bypassed and replaced by an emergency driver module with independent drivers.

In some embodiments, the primary driver module may contain a larger number of read and write drivers than are contained in the emergency driver module. Some emergency driver modules may contain a single read-capable driver in the emergency driver module, while others may contain just a few read-capable modules. According to aspects of the present disclosure, some embodiments of emergency driver modules may contain only read-capable emergency drivers that can access the slave memory chips in the stacked computer memory module. Other embodiments may include both read and write-capable drivers in the emergency driver module. Aspects of the present disclosure may describe embodiments of stacked computer memory devices that contain a multiplexing unit within the master chip that attaches to both the emergency driver module and to each slave memory device within the stacked memory device.

Following activation of the emergency driver module, the memory controller may send a configuration command enabling the multiplexing unit in the master chip to begin receiving data from slave memory chips, as shown in block 325. The memory controller may then send a command signal to the emergency driver module and the multiplexing unit to select a particular portion of the memory chip(s) for emergency data retrieval, as shown in block 330. According to embodiments of the present disclosure, examples of computer memory systems that may perform this function may include DDR4 DRAM devices where individual DRAM chips (slave memory chips) may be selected by using MRS (mode register set) commands.

For instance, a particular rank may span multiple DRAM devices and the emergency driver module may not have sufficient bandwidth for an entire rank. The MRS command can be used to select individual DRAM devices, within the same rank, for emergency data retrieval, and a properly configured multiplexing unit may sequentially access multiple memory arrays in several slave memory chips in order to download the data to a new storage location.

In embodiments where the emergency driver module contains additional read driver bandwidth, the data retrieval rate may be correspondingly increased. Further, a single emergency driver module in a stacked computer memory module may serve to provide emergency retrieval access to multiple slave memory chips, e.g., as opposed to each piece of solid state memory having a separate emergency driver module.

In some embodiments, the multiplexing unit may be controlled by unused column address bits in the MRS command string. Some of the MRS command string may specify the individual slave memory chip to be accessed, while other portions of the command string may indicate the row and address columns to be read before a new MRS command string is transmitted by the memory controller. Some column address bits may be unused for a particular data download request and may be repurposed to identify a specific burst. Consistent with embodiments, the memory controller can be configured to use unused column bits to identify BL8 (burst length 8), BL4 (Burst length 4) per chip. The emergency driver module can the serialize data from the burst accordingly. In certain embodiments, 3 column address bits may be used (e.g., for a x8 DRAM stack). In other embodiments, (e.g., in case of a x4 DRAM stack) 2 column address bits may be used to specify a specific DQ pin to be used for downloading data from the stacked memory device as part of the emergency retrieval.

According to aspects of the present disclosure, some embodiments may set aside one or more dedicated pin(s) (or communication channel) in the master chip that can be used for emergency data retrieval. In various embodiments, a pin (or communication channel) used during normal accesses of the primary driver module may also be used when performing emergency data retrieval. Routing logic can be used to select between the primary driver module (during normal operation) and the emergency driver module (during emergency data retrieval). For example, a multifunctional pin may communicate both MRS commands and data to and from the computer memory arrays.

The method then enters a loop to accomplish retrieval of all the relevant data in the stacked memory device. The memory controller initiates reading the data from the first slave memory chip and determines whether all the relevant data has been read from the current chip. If not, as indicated in block 345, then the data retrieval process continues by requesting access to the remaining data within the selected portion of memory. If data retrieval is complete, the system can determine whether the current slave memory chip being accessed is the last slave memory chip to be accessed during the retrieval process, as shown in block 350.

When there are additional slave memory chips to be read, then the memory controller selects another slave memory chip for reading through the multiplexing unit, as shown in block 355. When there are no further slave memory chips to be read, then the memory controller can deconfigure the computer memory, as shown in block 360, removing it from system use. The memory controller may then disable power delivery to the stacked computer memory where the error occurred, as shown in block 370, in order to reduce power consumption for the computer system. The method ends in block 399.

Figure 4:
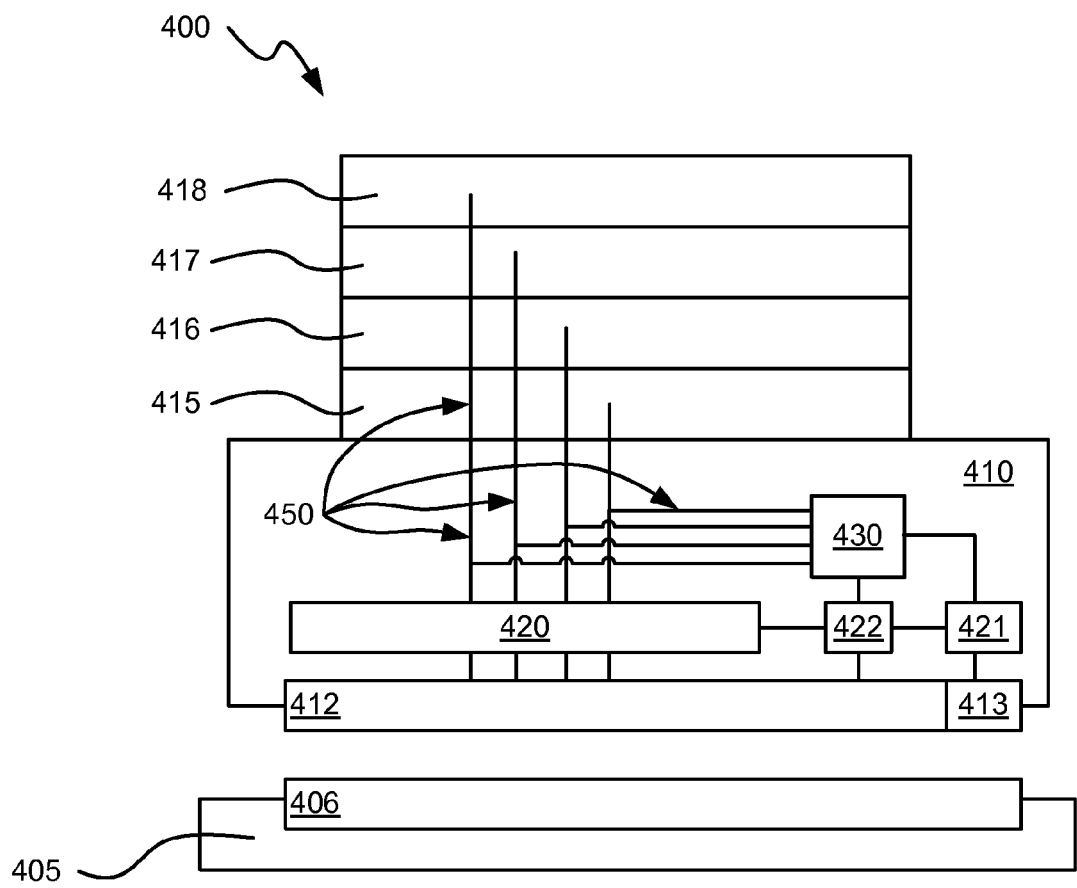
FIG. 4 portrays an embodiment of a stacked memory module with an emergency data retrieval circuit according to the present disclosure.

FIG. 4 portrays an embodiment of a stacked computer memory module 400 according to aspects of the present disclosure. A stacked computer memory module 400 may be mounted on a printed circuit board 405 having a mounting area 406 and communicatively connected to the substrate by a chip connection array 412 made of solder bumps or other electrical connection devices to allow power and data to be shared with the substrate 405. The mounting area 406 may be a socket or may contain a plurality of pads configured to fit with the chip connection array 412. Stacked computer memory module 400 may contain a master chip 410 and a plurality of slave memory chips 415, 416, 417, and 418 that are communicatively interconnected by an internal data bus 450.

Master chip 410 may further contain a primary driver module 420, an emergency driver module 421, a multiplexing unit 430 and a master memory logic 422. The primary driver module 420 may be connected to the chip connection array 412 (e.g., a set of pins in a socket or a ball grid array) and the internal data bus 450 in order to send and receive data between memory devices within the slave memory chips and the rest of the computer memory system. Slave memory chips may alternatively be communicatively connected to the substrate 405 by means of an electrical path running through the internal data bus 450, the multiplexing unit 430, the emergency driver module, and an emergency data connection 413. The multiplexing unit 430 and emergency driver module 421 may transfer data to emergency data retrieval connection 413 when primary driver module 420 is disabled. In some embodiments, emergency data connection 413 (such as a soldered pin, wirebond connection, or solder bump/pad) may be a separate electrical connection from connections included within the chip connection array 412 and used during normal operation. In various embodiments, the emergency data connection 413 may be used by both the primary driver module and the emergency driver module. When first used as a component of the chip connection array 412, the primary driver module may be enabled and the emergency driver module may be disabled. When used as the emergency data connection 413, the primary driver module may be disabled (and thus the other elements of the chip connection array would be inactive) and the emergency driver module may be activated, such as after certain communication errors have been detected.

Primary driver module 420 may contain a plurality of individual read drivers and write drivers (or paired read/write driver circuit elements) that perform data retrieval and storage functions in the plurality of slave memory chips for the stacked computer memory device. In some embodiments, the primary driver module may contain both sufficient read and write drivers to communicate with all portions of the slave memory chip memory arrays, as well as some redundant read and write drivers that may be activated to replace read or write drivers in primary driver module that fail under certain conditions. Under certain conditions a number of read drivers or write drivers may experience a hard fail, at which time a memory controller may send a signal to the master memory logic 422 (which may be connected to each of the circuit connection element 412, the primary driver module 420, emergency driver module 421, and multiplexing unit 430). Control signals received by the master memory logic 422 may include instructions to disable primary driver module 420, enable emergency driver module 421, to identify individual slave memory devices to be read, and instructions to direct the multiplexing unit 430 as to what data in data read from the slave memory devices should be transferred to other computer memory during an emergency data retrieval operation. In some embodiments, the internal data bus may be made of a series of through silicon vias (TSVs) and solder bump interconnects between stacked chips. The solder bumps and the through silicon vias may be axially aligned to create vertical electrical wiring filaments that reach upward from the top surface of the master chip, through at least the lowest slave memory chip 415, and up to the topmost slave memory chip 418.

In some embodiments, the master memory logic 422 may receive MRS instructions intended to select a particular slave memory chip and a certain portion of a memory array within that slave memory chip (e.g., a particular memory device within a rank of multiple memory devices). This can be particularly useful for controlling the multiplexing unit 430 to allow for the use of an emergency driver module with less bandwidth than the internal bus 450. For example, the internal data bus could be 64 bits whereas the emergency driver module might be configured to only handle 8 bits at time. The multiplexing unit could allow for selection of a different 8 bits of the internal 64 bit bus. A single read on the primary bus could then be split into 8 separate reads by selecting different sections of the internal bus. The selection can be controlled based upon data provided in MRS commands. Accordingly, a portion of the data received by the multiplexing unit 430 can be transmitted through the emergency driver module 421 and the emergency data connection 413 to another storage location, whether a magnetic hard disk, optical disk, magneto-optical drive, DRAM storage or a solid state drive.

Referring to FIGS. 1-4, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of retrieving data from a stacked memory device having a plurality of slave memory chips, the method comprising:
   recognizing a problem in the stacked memory device using a data recovery logic element in a master chip of the stacked memory device;
   determining that the problem is associated with a primary driver module in the stacked memory device and in response:
   disabling the primary driver module;
   enabling an emergency driver module;
   selecting each of the plurality of slave memory chips using a multiplexing unit to retrieve data using the emergency driver module, wherein selecting each of the plurality of slave memory chips using a multiplexing unit is responsive to a mode register set command from a memory controller for the stacked memory device;
   wherein the mode register set command specifies a plurality of respective portions of at least two respective slave memory chips;
   sequentially retrieving respective portions of data from a first slave memory chip in the plurality of slave memory chips;
   configuring the multiplexing unit to select a second slave memory chip; and
   sequentially retrieving respective portions of data from the second slave memory chip.

2. The method of claim 1, further comprising determining that the problem is associated with a failure of at least one pair of a plurality of read/write driver pairs of the primary driver module.

3. The method of claim 2, further comprising sequentially testing pairs of the plurality of read/write driver pairs by reading and writing data to the plurality of slave memory chips.

4. The method of claim 3, further comprising determining that the problem is associated with the primary driver module by:
   activating a backup read/write driver pair of the primary driver module; and
   instructing the backup read/write driver pair to read and write data to a slave memory chip.

5. The method of claim 1, wherein further comprising using unused column bits to identify a burst length and serializing data received from a corresponding burst.

6. The method of claim 5, further comprising using 2 unused column bits to identify the burst length as a burst length 4 and serializing data received from a corresponding burst length 4.

7. The method of claim 1, wherein the stacked memory device comprises a double data rate fourth-generation (DDR4) dynamic random-access memory (DRAM) stacked memory device.

8. The method of claim 7, wherein the emergency driver module comprises a portion of a master chip of the stacked memory device.

9. The method of claim 8, wherein the emergency driver module comprises a single read-capable driver.

10. The method of claim 1, wherein a data bus connecting the stacked memory device to a tangible storage medium comprises a first number of bits, wherein the emergency driver module comprises a second number of bits, wherein the mode register set command splits the data bus into equal sections such that each respective section comprises a number of bits equal to or less than the second number of bits.

11. The method of claim 10, wherein the data bus comprises 64 bits, wherein the emergency driver module comprises 8 bits, wherein the mode register set command splits the data bus into 8 sections comprising 8 bits.

* * * * *